United States Patent
Akasaka

(10) Patent No.: US 7,158,287 B2
(45) Date of Patent: Jan. 2, 2007

(54) DISTRIBUTED AND DISCRETE AMPLIFICATION OF OPTICAL SIGNALS

(75) Inventor: Youichi Akasaka, Foster City, CA (US)

(73) Assignee: Sprint Communications Company L.P., Overland Park, KS (US)

(*) Notice: Subject to any disclaimer, the term of this patent is extended or adjusted under 35 U.S.C. 154(b) by 471 days.

(21) Appl. No.: 10/397,927

(22) Filed: Mar. 26, 2003

(65) Prior Publication Data

US 2004/0190118 A1    Sep. 30, 2004

(51) Int. Cl.
*H01S 3/00* (2006.01)

(52) U.S. Cl. .................... 359/337.4; 359/334

(58) Field of Classification Search .......... 359/334, 359/337, 337.4
See application file for complete search history.

(56) References Cited

U.S. PATENT DOCUMENTS

| | | | |
|---|---|---|---|
| 6,205,164 B1 * | 3/2001 | Ohishi et al. .............. | 372/70 |
| 6,441,952 B1 | 8/2002 | Duan et al. | |
| 6,556,341 B1 * | 4/2003 | Krummrich et al. ....... | 359/334 |
| 6,876,489 B1 * | 4/2005 | Islam et al. ................ | 359/334 |
| 6,885,498 B1 * | 4/2005 | Islam ......................... | 359/334 |
| 2002/0063948 A1 | 5/2002 | Islam et al. | |

OTHER PUBLICATIONS

Emori, Yoshihiro; Akasaka, Youichi; Namiki, Shu, "Less than 4.7 dB Noise Figure Broadband In-line EDFA with A Raman Amplified-1300 ps/nm DCF Pumped by Multi-channel WDM Laser Diodes," OAA '98 (1998).

Akasaka, Y.; Sugizaki, R.; and Kamiya, T., "Dispersion Compensating Technique of 1300nm Zero-Dispersion SM Fiber to Get Flat Dispersion at 1550nm Range," Proc. 21st Eur. Conf. on Opt. Comm., ECOC'95-Brussels, pp. 605-608 (1995).

Mori, Atsushi; et al., "1.5 μm Broadband Amplification by Tellurite-Based EDFAs," OFC '97, PD1-1-PD1-4 (1997).

Yamada, Makoto, et al., "Fluoride-Based Erblum-Doped Fiber Amplifer with Inherently Flat Gain Spectrum," IEEE Photonics Technology Letters, vol. 8, No. 7, Jul. 1996.

Inoue, Hiroyuki, et al., "The Study on the Structure of ZrF4-BaF2-RF3 (R=Al, La) Glasses," Journal of Non-Crystalline Solids 95 & 96 (1987), pp. 217-224; North Holland, Amsterdam.

Millar, C.A., et al., "Optical Amplification in an Erbium-Doped Fluorozirconate Fibre Between 1480nm and 1600nm," ECOC '88, pp. 66-69, (1988).

Yamada, Makoto, et al., "A Low-Noise and Gain-Flattened Amplifier Composed of a Silica-Based and a Fluoride-Based Er3+—Doped Fiber Amplifier in a Cascade Configuration," IEEE Photonics Technology Letters, vol. 8, No. 5, May 1996.

Meng, Z., et al., "1.55—μm Ce-Er-ZBLAN Fiber Laser Operation Under 980-nm Pumping: Experiment and Simulation," IEEE Photonics Technology Letters, vol. 14, No. 5, May 2002.

(Continued)

*Primary Examiner*—Mark Hellner

(57) ABSTRACT

An optical amplifier system is disclosed comprising a discrete amplifier system and a distributed amplifier system. The discrete amplifier system receives optical signals and amplifies the optical signals having wavelengths in a target wavelength band. The target wavelength band has a bandwidth of at least 80 nm. The distributed amplifier system amplifies the optical signals having wavelengths in a longer wavelength band of the target wavelength band, a shorter wavelength band of the target wavelength band, or both.

17 Claims, 13 Drawing Sheets

OTHER PUBLICATIONS

Kubota, Yoshinori, et al., "Novel Er and Ce co-doped Fluoride Fiber amplifer for low-noise and high-efficient operation with 980-nm Pumping,"Dec. 9, 2002.

Yamada, Makoto, et al., "Temperature Dependence of Signal Gain in Er3+—Doped Optical Fiber Amplifiers," IEEE Journal of Quantum Electronics, vol. 28, No. 3, Mar. 1992, pp. 640-649.

Nishida, Yoshiki, et al., "Reliability of Fluoride Fiber Module for Optical Amplifier Use," IEEE Photonics Technology Letters, vol. 11, No. 12, Dec. 1999, pp. 1596-1598.

Kado, Soko, et al., "Broadband flat-noise Raman amplifier using low-noise bi-directionally pumping sources," ECOC '01 pp. 38-39, (2001).

Masuda, Hiroji, et al., "75-nm 3-dB Gain-band Optical Amplification with Erbium-doped Fluoride Fibre Amplifiers and Distributed Raman Amplifiers in 9×2.5-Gb/s WDM Transmission Experiment," 11th International Conference on Integrated Optics and Optical Fibre Communications, 23rd European Conference on Optical Communications, IOOC-ECEC97. Post Deadline Papers (Conf. Publ. No. 448) IEE, Longdon, UK., vol. 5, Sep. 22, 1997.

Pizzinat, Anna, et al., "Impact of Hybrid EDFA-Distributed Raman Amplification on a 4×40-Gb/s WDM Optical Communication System," IEEE Photonics Technology Letters IEEE USA, vol. 15, No. 2, Feb. 2003.

\* cited by examiner

DISTRIBUTED AND DISCRETE AMPLIFICATION OF OPTICAL SIGNALS

BACKGROUND OF THE INVENTION

1. Field of the Invention

The invention is related to the field of communication systems, and in particular, to systems and methods of providing distributed and discrete amplification of optical signals.

2. Statement of the Problem

Many communication companies use fiber optic cabling as a media for transmitting data because of its high-bandwidth capacity. Fiber optic cables reliably transport optical signals over long distances. Over a distance, optical signals attenuate in the fiber due to Rayleigh scattering. The attenuation may be recovered by an optical amplifier. However, the optical amplifier adds noise to the optical signals. The noise accumulation on the optical signals can especially be a problem for ultra long haul transmissions.

Optical amplifiers may be discrete amplifiers or distributed amplifiers. Distributed amplifiers use the transmission fiber carrying the optical signals as a gain medium. Discrete amplifiers do not use transmission fiber as a gain medium, but use another type of fiber or component as the gain medium.

One type of discrete amplifier is an Erbium-Doped Fiber Amplifier (EDFA). In an EDFA, an Erbium-doped fiber receives optical signals from a transmission fiber. A pump transmits light having a wavelength of 980 nm onto Erbium-doped fiber concurrently as the optical signals travel over the Erbium-doped fiber. The properties of the Erbium-doped fiber act to absorb the pumped light and generate a gain in the optical signals using the absorbed light. The Erbium-doped fiber acts as the gain medium, not the transmission fiber. Unfortunately, traditional EDFA's have a limit on the gain bandwidth they can produce. For instance, a C-band EDFA has a gain bandwidth of about 30 to 40 nm (1530 nm to 1570 nm). As the demand for capacity increases, the C-band may not be enough to handle the needed capacity.

There are certain types of discrete amplifiers that have a wider gain bandwidth than a traditional EDFA. In one type of discrete amplifier, a splitter separates optical signals into three bands: the C-band, the L-band, and the S-band. The C-band comprises a range of wavelengths of approximately 1530 nm to 1570 nm. The L-band comprises a range of wavelengths of approximately 1570 nm to 1600 nm. The S-band comprises a range of wavelengths of approximately 1500 nm to 1530 nm. The splitter transfers the three different bands to three different rare earth doped fiber amplifiers. Each amplifier is configured to amplify one of the bands. A combiner receives the amplified bands and re-combines the optical signals. This configuration generates a gain bandwidth of about 100 nm. Unfortunately, the splitter, the three amplifiers, and the combiner can be expensive and complicated to implement. This configuration is discussed further below and is shown in FIG. 1a.

Another discrete amplifier having a wider gain bandwidth than a traditional EDFA is a Telluride-based EDFA (T-EDFA). Telluride-based EDFAs have a gain bandwidth of about 75 nm. Unfortunately, fiber non-linearity may be a problem with Telluride-based EDFAs. The fiber non-linearity may cause some of the 75 nm gain bandwidth to be unusable.

Another discrete amplifier with a wider gain bandwidth than a traditional EDFA is a fluoride-based EDFA (F-EDFA). F-EDFAs have a gain bandwidth of about 100 nm. Unfortunately, the F-EDFAs may generate an undesirable noise figure, especially for the longer and shorter wavelength bands of the 100 nm gain bandwidth. A gain region having a high noise figure may have a significantly reduced transmission distance compared to a gain region having a low noise figure. F-EDFAs are discussed further below and shown in FIG. 2a.

Another type of discrete amplifier with a wider gain bandwidth than a traditional EDFA is a Raman amplifier. In a discrete Raman amplifier, a fiber span within the Raman amplifier receives optical signals from a transmission fiber. The fiber span may be a highly doped fiber, such as a dispersion compensating fiber. A Raman pump backward pumps light onto the fiber span carrying the optical signals. Based on the "Raman Effect", the light amplifies the optical signals traveling on the fiber span. The discrete Raman amplifier provides a wider gain bandwidth than traditional EDFAs and allows for replacement of high-powered EDFAs. However, the discrete Raman amplifier generates a higher noise figure than EDFAs and high power Raman pumps are needed to generate the wide gain bandwidth.

Distributed amplifiers have been used with discrete amplifiers to provide a higher gain to optical signals. For the distributed amplifier, a Raman pump pumps light onto a transmission fiber span. The light amplifies optical signals traveling over the fiber span. A discrete amplifier then receives the optical signals and amplifies the optical signals. The distributed amplifier and the discrete amplifier work together to amplify the optical signals. One problem with the current distributed/discrete amplifier configurations is that the distributed amplifier only amplifies the same wavelengths as the discrete amplifier. Thus, this configuration may still have the problems caused by the discrete amplifiers' limited gain bandwidth and/or high pump powers. The distributed/discrete amplifier configuration is discussed further below and shown in FIG. 3a.

SUMMARY OF THE SOLUTION

One example of the invention helps solve the above problems with an optical amplifier system comprising a discrete amplifier system and a distributed amplifier system. The discrete amplifier system receives optical signals and amplifies the optical signals having wavelengths in a target wavelength band. The target wavelength band has a bandwidth of at least 80 nm. The distributed amplifier system amplifies the optical signals having wavelengths in at least one of a longer wavelength band and a shorter wavelength band of the target wavelength band.

The optical amplifier system advantageously provides a wider gain bandwidth than traditional EDFAs and provides a lower and flatter noise figure than other wide-gain bandwidth configurations. By having a lower, flatter noise figure, the longer and shorter wavelength bands may carry data over long distances.

Another example of the invention includes an optical amplifier system comprising a first transmission fiber span, a first pump system, a discrete amplifier system, a second transmission fiber span, and a second pump system. The discrete amplifier system in this example is configured to amplify optical signals having wavelengths in a target wavelength band. The target wavelength band has a bandwidth of at least 80 nm. The first transmission fiber span transports optical signals. The first pump system backward pumps light onto the first transmission fiber span to amplify the optical signals having wavelengths in a longer wavelength band of the target wavelength band, a shorter wavelength band of the target wavelength band, or both. The discrete amplifier system then receives the optical signals. The discrete amplifier system amplifies the optical signals having wavelengths in the target wavelength band and transmits the optical signals to the second transmission fiber span. The second transmission fiber span receives the optical signals and transports the optical signals. The second pump system forward pumps light onto the second transmission fiber span to amplify the optical signals having wavelengths in the longer wavelength band, the shorter wavelength band, or both. This amplification using forward pumping could also be done in the first transmission fiber span.

Another example of the invention includes an optical amplifier system comprised of a discrete amplifier system, a distributed amplifier system, and a control system. The discrete amplifier system receives optical signals and amplifies the optical signals having wavelengths in a target wavelength band. The target wavelength band has a bandwidth of at least 80 nm. The control system receives instructions to amplify the optical signals having wavelengths in the longer wavelength band of the target wavelength band, the shorter wavelength band of the target wavelength band, or both. The control system controls the distributed amplifier system based on the instructions to amplify the optical signals having wavelengths in the longer wavelength band, the shorter wavelength band, or both.

The invention may include other examples described below.

DESCRIPTION OF THE DRAWINGS

The same reference number represents the same element on all drawings.

FIG. 1b illustrates the gain generated by the discrete optical amplifier in FIG. 1a.

FIG. 2b illustrates the gain and noise figure generated by the Fluoride-based EDFA in FIG. 2a.

FIG. 3b illustrates the gain generated by the amplifier in FIG. 3a.

DETAILED DESCRIPTION OF THE INVENTION

FIGS. 1a–b, 2a–b, and 3a–b illustrate prior art optical amplifiers to help better understand the invention. FIGS. 4a–b, 5, 6, 7a–d, and 8 and the following description depict specific examples of optical amplifier systems to teach those skilled in the art how to make and use the best mode of the invention. For the purpose of teaching inventive principles, some conventional aspects of the optical amplifier systems have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Optical Amplifiers—FIGS. 1a–b, 2a–b and 3a–b

Figure 1A:
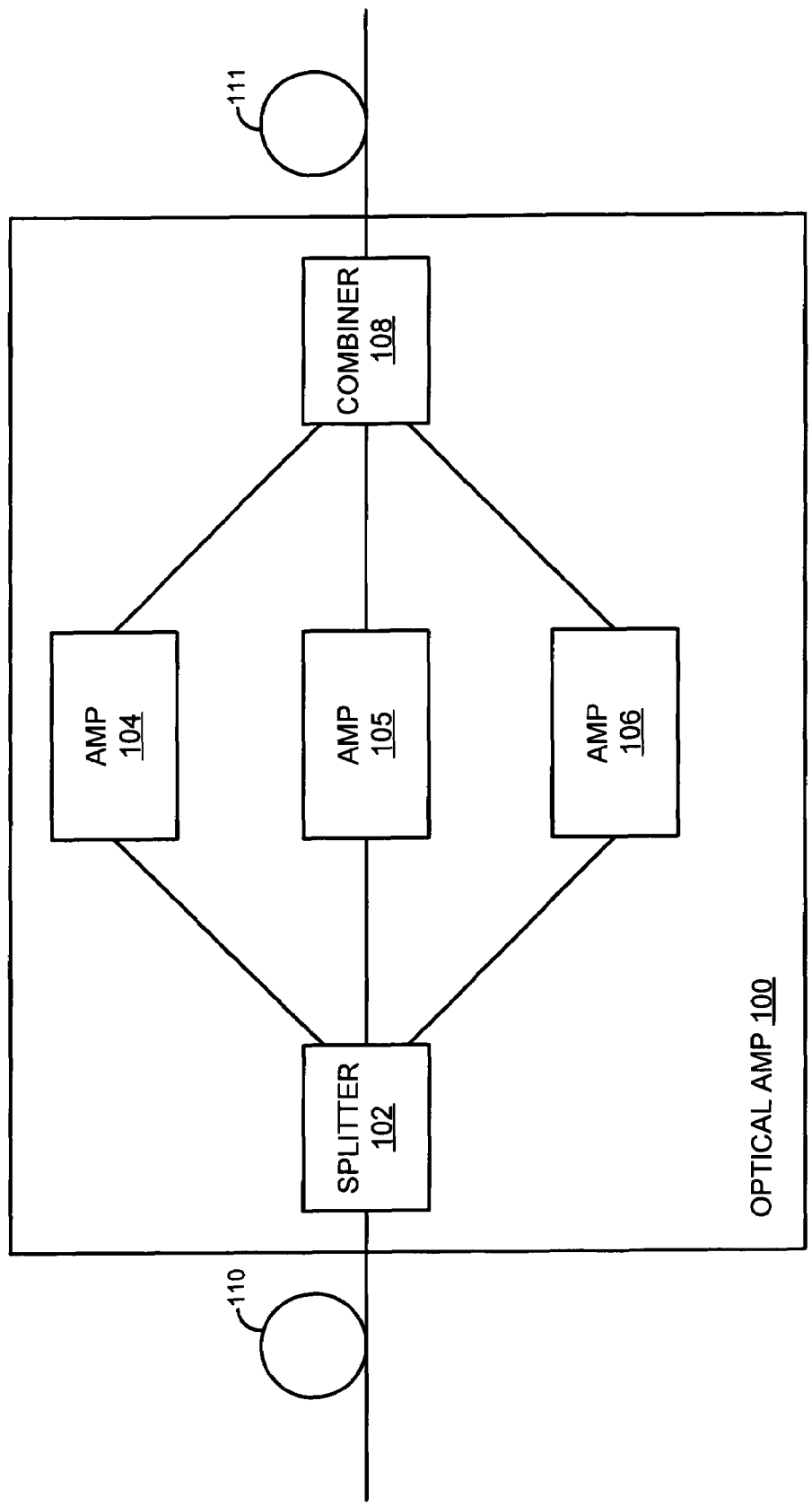
FIG. 1a illustrates a discrete optical amplifier configuration in the prior art.

FIG. 1a illustrates a discrete optical amplifier 100 in the prior art. Optical amplifier 100 is comprised of a splitter 102, rare earth doped fiber amplifiers 104–106, and a combiner 108. Optical amplifier 100 is coupled to transmission fiber spans 110 and 111. Splitter 102 is coupled to fiber span 110 and amplifiers 104–106. Amplifiers 104–106 are coupled to combiner 108. Combiner 108 is coupled to fiber span 111.

In operation, splitter 102 receives optical signals over fiber span 110. Splitter 102 separates the C-band, L-band, and the S-band of the optical signals. The C-band comprises a range of wavelengths of approximately 1530 nm to 1570 nm. The L-band comprises a range of wavelengths of approximately 1570 nm to 1600 nm. The S-band comprises a range of wavelengths of approximately 1500 nm to 1530 nm. Splitter 102 transfers the S-band to amplifier 104, transfers the C-band to amplifier 105, and transfers the L-band to amplifier 106. Amplifier 104 amplifies the wavelengths in the S-band and transfers the amplified S-band to combiner 108. Amplifier 105 amplifies the wavelengths in the C-band and transfers the amplified C-band to combiner 108. Amplifier 106 amplifies the wavelengths in the L-band and transfers the amplified L-band to combiner 108. Combiner 108 re-combines the optical signals with the amplified bands and transfers the optical signals over fiber span 111.

Figure 1B:
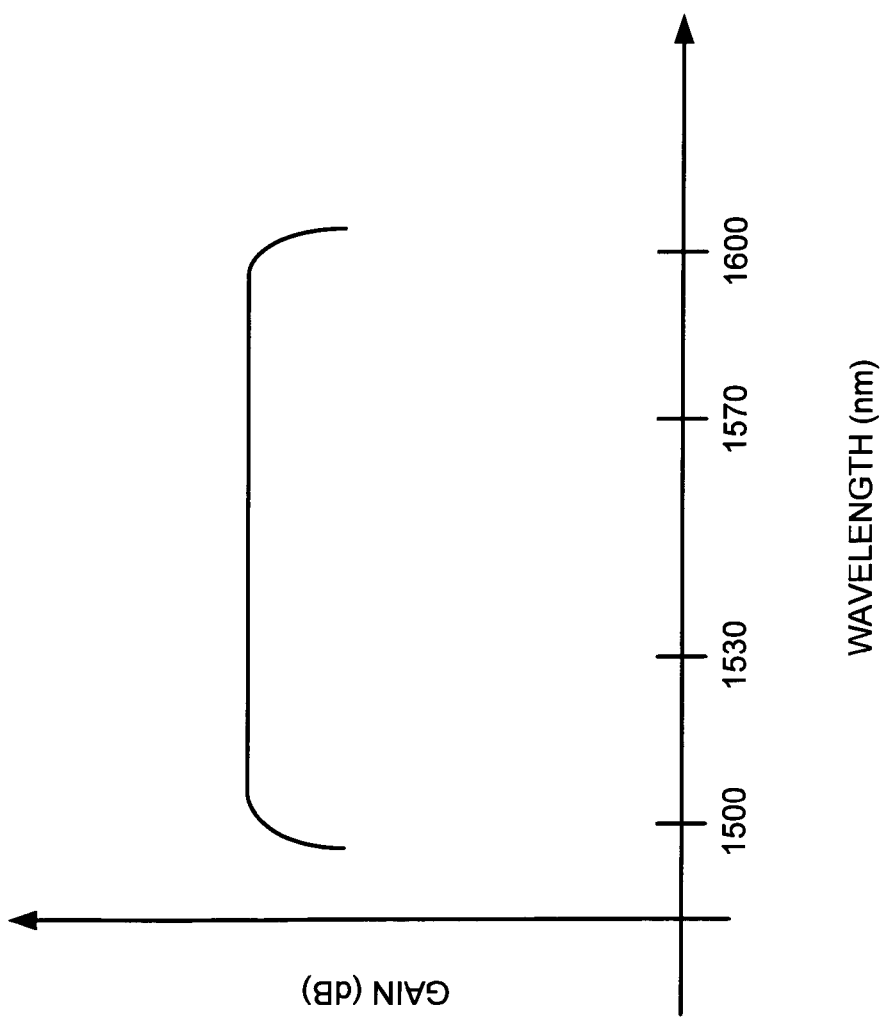

FIG. 1b illustrates the gain generated by optical amplifier 100. Optical amplifier 100 generates a gain bandwidth of about 100 nm. Although optical amplifier 100 generates a wider gain bandwidth, splitter 102, amplifiers 104–106, and combiner 108 can be expensive and complicated to implement.

Figure 2A:
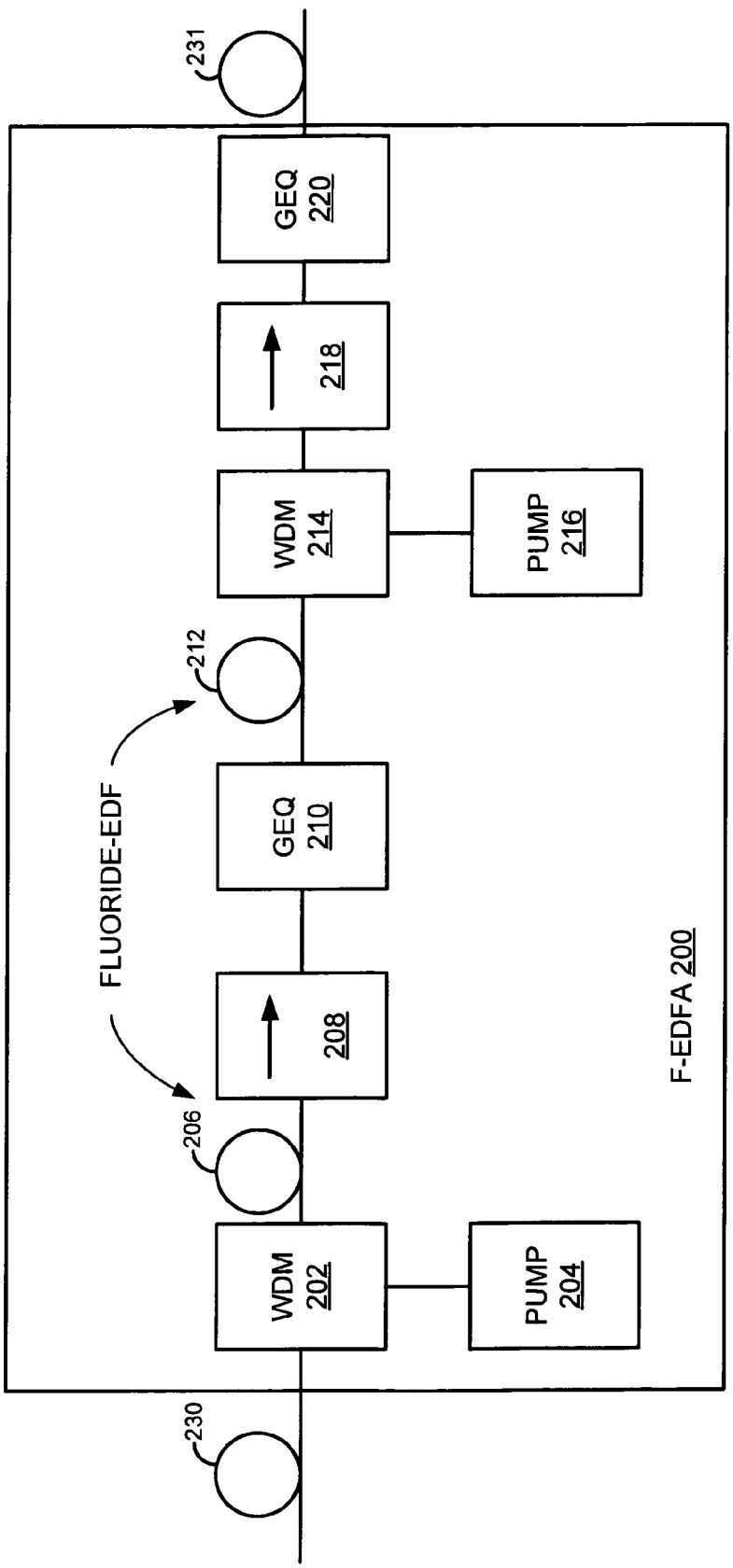
FIG. 2a illustrates a Fluoride-based EDFA in the prior art.

FIG. 2a illustrates a Fluoride-based EDFA (F-EDFA) 200 in the prior art. F-EDFA 200 is comprised of Wavelength Division Multiplexer (WDM) 202, a pump 204, a Fluoride-based Erbium-doped fiber 206, an isolator 208, a gain equalizing filter 210, a Fluoride-based Erbium-doped fiber 212, a Wavelength Division Multiplexer (WDM) 214, a pump 216, an isolator 218, and a gain equalizing filter 220. F-EDFA 200 is coupled to transmission fiber spans 230 and 231.

In operation, F-EDFA 200 receives optical signals over fiber span 230. In a conventional manner, F-EDFA 200 amplifies the optical signals having wavelengths in the S-band, the C-band, and the L-band. F-EDFA 200 then transfers the optical signals over fiber span 231.

Figure 2B:
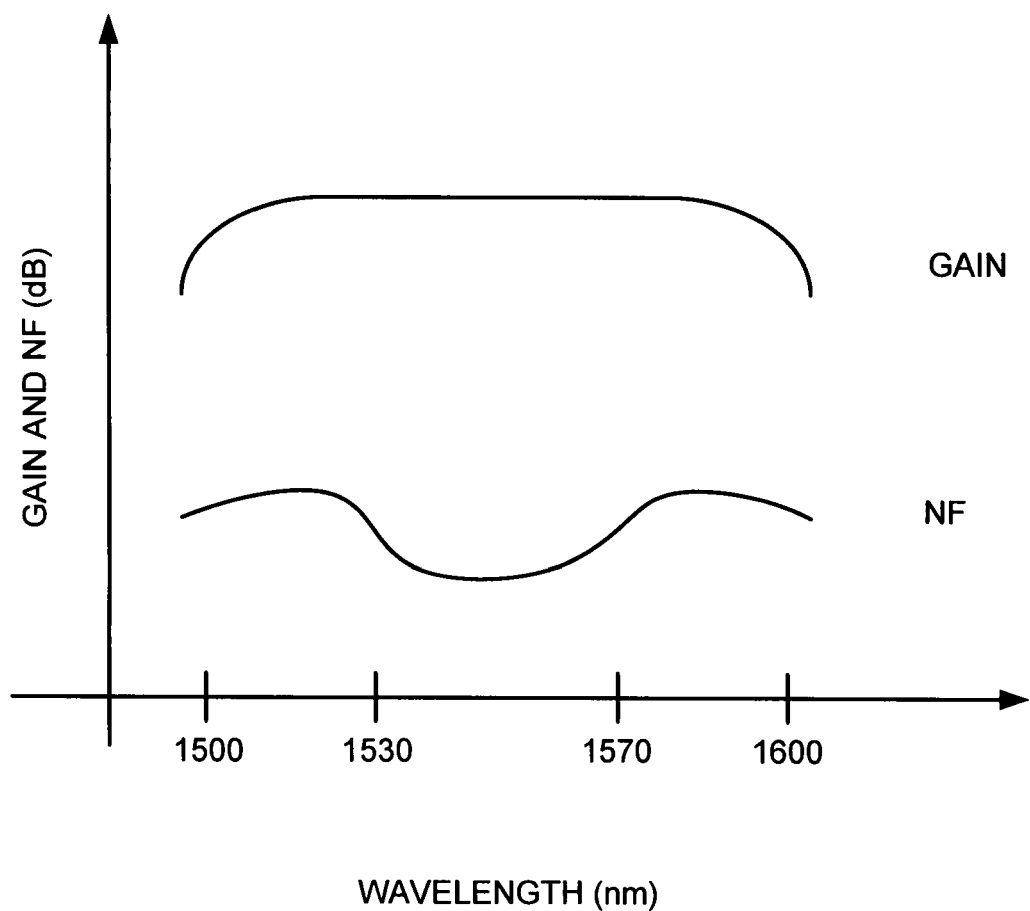

FIG. 2b illustrates the gain and noise figure generated by F-EDFA 200. F-EDFA 200 generates a gain bandwidth of about 100 nm by amplifying wavelengths in the S-band, the C-band, and the L-band. Although F-EDFA 200 generates a wider gain bandwidth than traditional EDFAs, the noise figure (NF) over the 100 nm gain bandwidth may be unacceptable, especially for the longer and shorter wavelength bands of the 100 nm gain bandwidth. The noise figure for the wavelengths between 1530 nm and 1570 nm (around the C-band) is relatively low compared to the noise figure for the wavelengths between 1500 nm and 1530 nm (S-band) and the wavelengths between 1570 nm and 1600 nm (L-band). A gain region having a high noise figure may have a significantly reduced transmission distance compared to a gain region having a low noise figure.

Figure 3A:
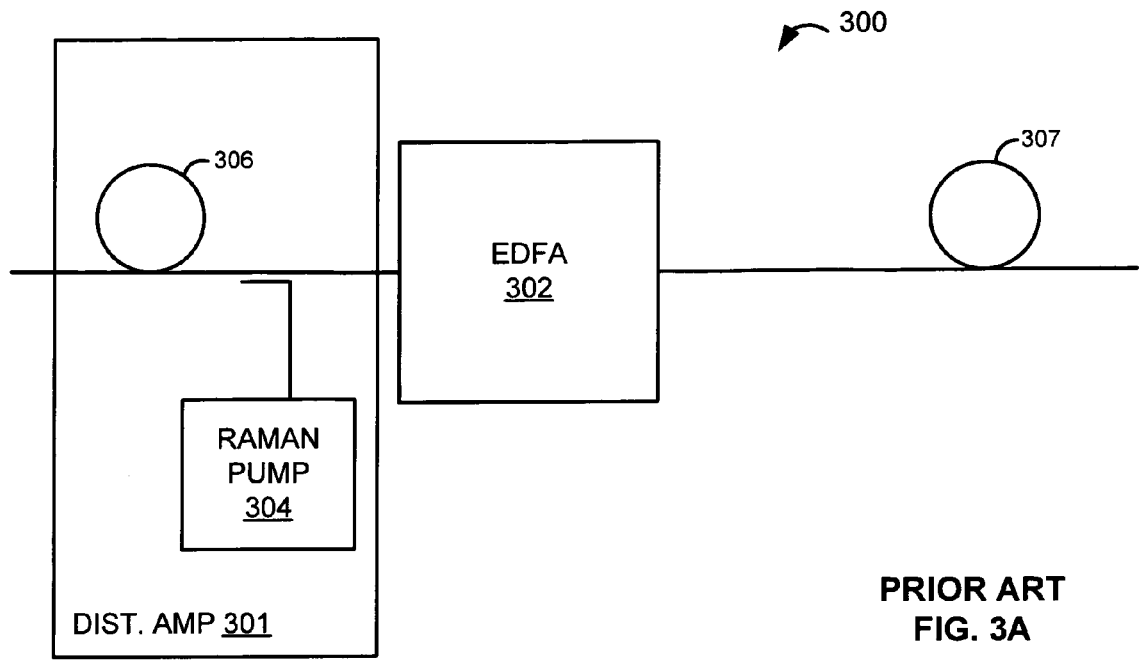
FIG. 3a illustrates a distributed/discrete amplifier configuration in the prior art.

FIG. 3a illustrates a distributed/discrete amplifier 300 in the prior art. Amplifier 300 is comprises an EDFA 302, which is the discrete amplifier. Amplifier 300 also comprises a Raman pump 304 and a transmission fiber span 306, which comprise the distributed amplifier. EDFA 302 is a traditional C-band EDFA. In operation, fiber span 306 carries optical signals. Raman pump 304 backward pumps light onto fiber span 306. The light pumped by Raman pump 304 amplifies the optical signals traveling over fiber span 306. EDFA 302 receives the optical signals and amplifies the optical signals having the wavelengths in the C-band. EDFA 302 then transfers the optical signals over fiber span 307. Raman pump 304 is configured to amplify the same wavelengths as EDFA 302.

Figure 3B:
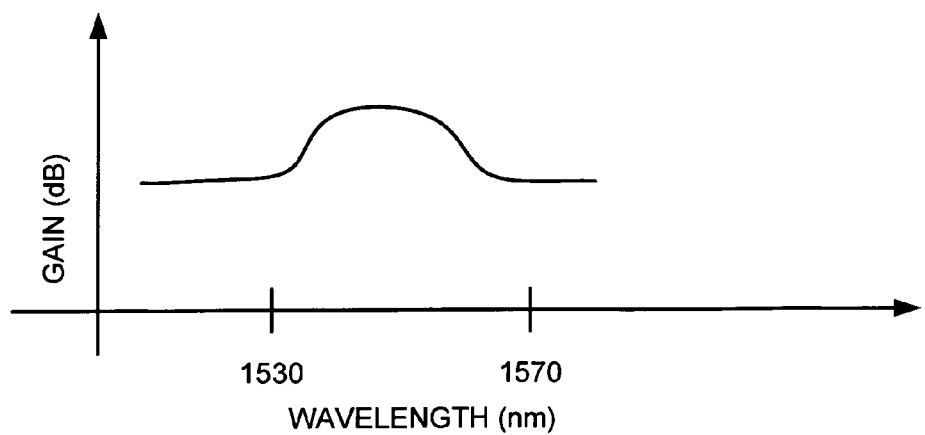

FIG. 3b illustrates the gain generated by amplifier 300. EDFA 302 and Raman pump 304 generate a gain bandwidth of about 40 nm by amplifying wavelengths in the C-band. Unfortunately in current distributed/discrete amplifier configurations, the distributed amplifier and the discrete amplifier are set to amplify the same wavelengths. Noise generated by either the discrete amplifier or the distributed amplifier may still cause problems for transmission distance.

Figure 4A:
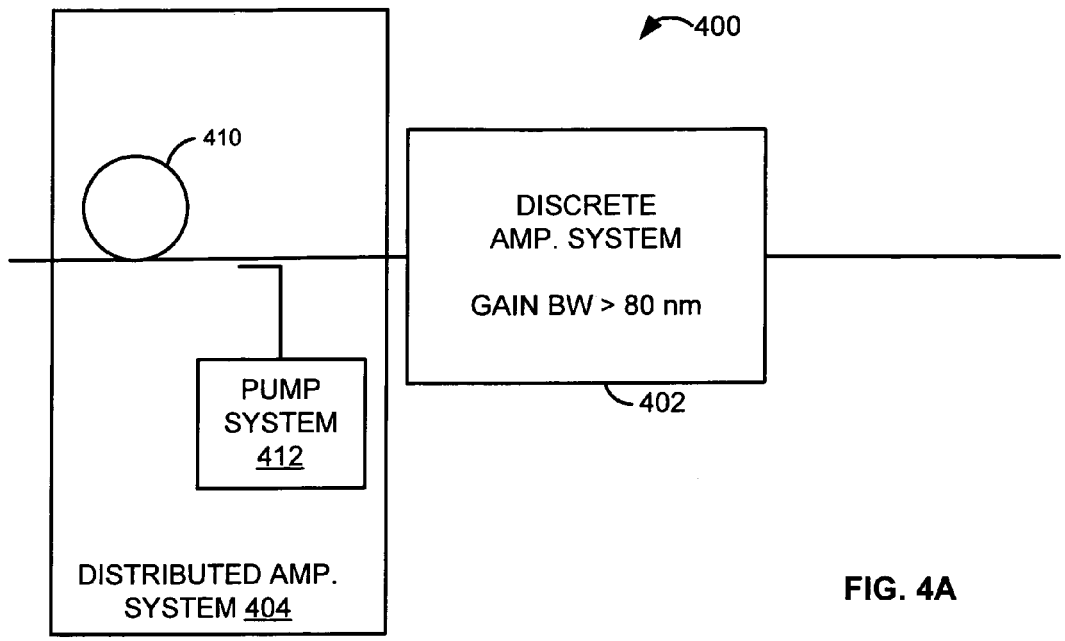
FIG. 4a illustrates an optical amplifier system in an example of the invention.
Figure 4B:
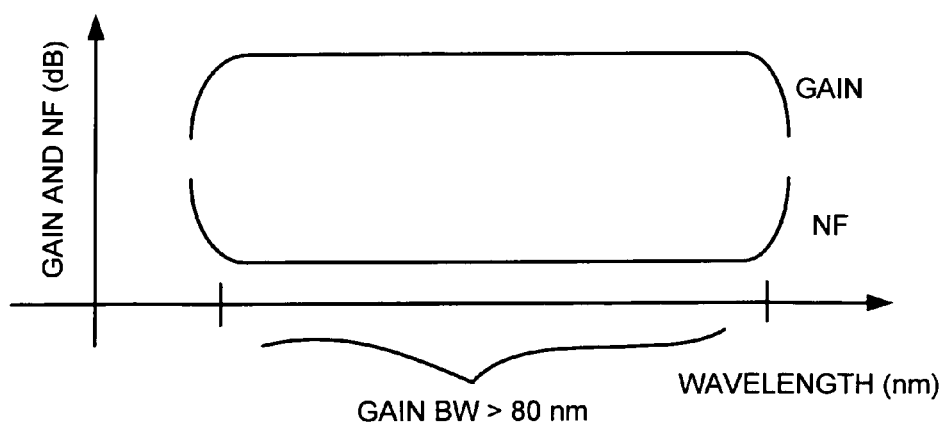
FIG. 4b illustrates a gain and noise figure generated by the optical amplifier system in FIG. 4a in an example of the invention.

Optical Amplifier System—FIGS. 4a and 4b

FIG. 4a illustrates an optical amplifier system 400 in an example of the invention. Optical amplifier system 400 is comprised of a discrete amplifier system 402 and a distributed amplifier system 404. Discrete amplifier system 402 has a gain bandwidth greater than 80 nm.

The following definitions may help to clarify the invention. A discrete amplifier system comprises any system, device, or component configured to amplify optical signals using a gain medium other than a transmission fiber span. One example of a discrete amplifier system is a Fluoride-based Erbium-Doped Fiber Amplifier (F-EDFA). A distributed amplifier system comprises any system, device, or component configured to amplify the optical signals using a transmission fiber span as a gain medium. One example of a distributed amplifier system is a Raman pump configured to pump light onto a transmission fiber span. A target wavelength band comprises any set of wavelengths used to carry data. A longer wavelength band refers to a set of longer wavelengths in the target wavelength band. A shorter wavelength band refers to a set of shorter wavelengths in the target wavelength band. For instance, assume a target wavelength band is defined as the range of wavelengths of 1500 nm to 1600 nm. The longer wavelength band may be the wavelengths from 1570 nm to 1600 nm (the longer wavelengths). The shorter wavelength band may be the wavelengths from 1500 nm to 1530 nm (the shorter wavelengths). A noise figure comprises any measurement of noise for optical signals. One example of a noise figure is a ratio between input Optical Signal-to-Noise Ratio (OSNR) and output OSNR.

Further, a transmission fiber span comprises any length of optical fiber between amplifiers. The transmission fiber span could be 40 km, 80 km, 100 km, or some other length. A pump system comprises any system, device, or component configured to pump light onto an optical fiber. One example of a pump system is a Raman pump configured to pump light having a wavelength of 1400 nm, 1480 nm, or some other wavelength. Backward pump refers to pumping light onto an optical fiber in a direction opposite to the optical signals traveling on the optical fiber. Forward pump refers to pumping light onto an optical fiber in the same direction as the optical signals traveling on the optical fiber.

In operation, discrete amplifier system 402 receives optical signals. Discrete amplifier system 402 amplifies the optical signals having wavelengths in a target wavelength band. The target wavelength band has a bandwidth of at least 80 nm. Distributed amplifier system 404 amplifies the optical signals having wavelengths in a longer wavelength band of the target wavelength band, a shorter wavelength band of the target wavelength band, or both. Based on the above description, one skilled in the art would be able to modify existing optical amplifier systems to make optical amplifier system 400.

The wavelengths in the longer wavelength band and the shorter wavelength band can be set differently for different operations. If the outer wavelengths of the target wavelength band experience noise problems, the longer and shorter wavelength bands can be set to include those wavelengths. Distributed amplifier system 404 can then be configured to help alleviate those problems by amplifying the optical signals having wavelengths in the bands experiencing problems.

FIG. 4b illustrates a gain and noise figure generated by optical amplifier system 400 in an example of the invention. Optical amplifier system 400 generates a gain bandwidth greater than 80 nm. Over this gain bandwidth, the noise figure (NF) is substantially flat. Compared to the noise figure in FIG. 2b, the noise figure in FIG. 4b is relatively low for the longer wavelengths and the shorter wavelengths in the gain bandwidth. Optical amplifier system 400 advantageously provides a wider gain bandwidth than traditional EDFAs and provides a lower and flatter noise figure than other wide-gain bandwidth configurations. By having a lower, flatter noise figure, the longer and shorter wavelength bands may carry data over long distances.

As stated above, distributed amplifier system 404 is configured to amplify the longer wavelength band, the shorter wavelength band, or both. For instance, assume that discrete amplifier system 402 is configured to amplify wavelengths in the S-band, the C-band, and the L-band. Distributed amplifier system 404 may be configured to amplify the L-band more than other bands to improve the noise figure for the L-band. Distributed amplifier system 404 may be configured to amplify the S-band more than other bands to improve the noise figure for the S-band. Distributed amplifier system 404 may also be configured to amplify the L-band and the S-band more than the C-band to improve the noise figure for the L-band and the S-band.

Distributed amplifier system 404 may comprise a transmission fiber span 410 and pump system 412. Distributed amplifier system 404 may comprise different configurations, all of which are within the scope of the invention. Looking at FIG. 4a, the optical signals may be traveling from left to right, or right to left, both of which are within the scope of the invention. In the first example where fiber span 410 carries the optical signals from left to right, pump system 412 backward pumps the light onto fiber span 410. The backward pumping light amplifies the optical signals having wavelengths in the longer wavelength band, the shorter wavelength band, or both. The backward pumping light may also amplify the optical signals between the longer wavelength band and the shorter wavelength band, but pump system 412 is configured to amplify one or both of the longer wavelength band and the shorter wavelength band. Discrete amplifier system 402 then receives the optical signals. Discrete amplifier system 402 amplifies the optical signals having wavelengths in the target wavelength band.

In the second example where fiber span 410 carries the optical signals from right to left, discrete amplifier system 402 receives the optical signals. Discrete amplifier system 402 amplifies the optical signals having wavelengths in the target wavelength band. Discrete amplifier system 402 then transfers the optical signals to fiber span 410. Pump system 412 forward pumps the light onto fiber span 410. The forward pumping light amplifies the optical signals having wavelengths in the longer wavelength band, the shorter wavelength band, or both. The forward pumping light may also amplify the optical signals between the longer wavelength band and the shorter wavelength band, but pump system 412 is configured to amplify one or both of the longer wavelength band and the shorter wavelength band.

Figure 5:
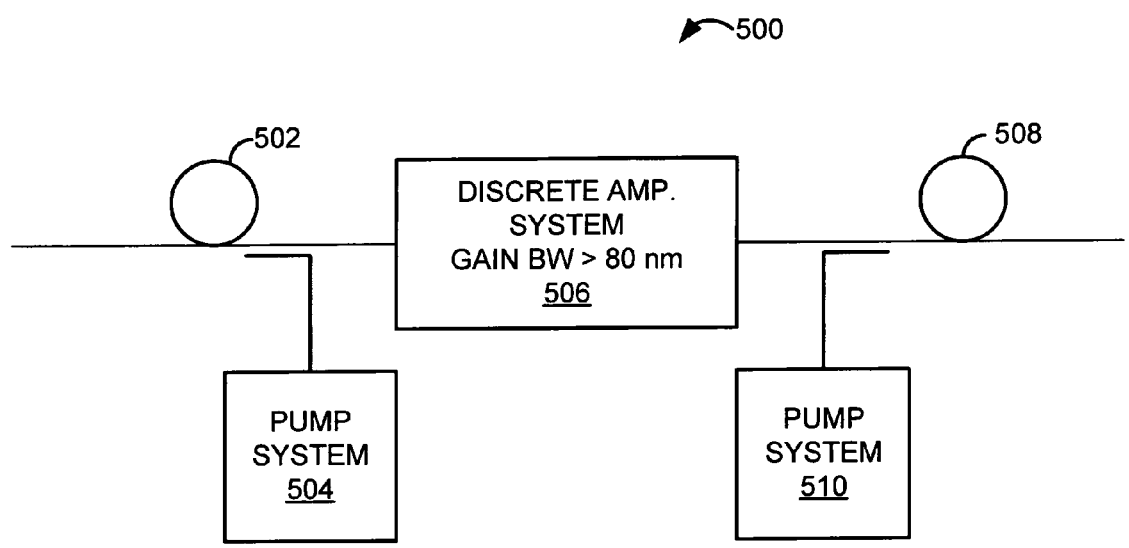
FIG. 5 illustrates an optical amplifier system in an example of the invention.

Another Optical Amplifier System—FIG. 5

FIG. 5 illustrates another example of an optical amplifier system 500 in an example of the invention. Optical amplifier system 500 is comprised of a transmission fiber span 502, a pump system 504, a discrete amplifier system 506, a transmission fiber span 508, and a pump system 510. Discrete amplifier system 506 and pump system 504 are coupled to fiber span 502. Discrete amplifier system 506 and pump system 510 are coupled to fiber span 508. Discrete amplifier system 506 has a gain bandwidth greater than 80 nm. The wavelengths comprising the gain bandwidth in this example are referred to as the target wavelength band.

In operation, fiber span 502 transports optical signals. Pump system 504 backward pumps light onto fiber span 502. The light amplifies the optical signals having wavelengths in the longer wavelength band of the target wavelength band, the shorter wavelength band of the target wavelength band, or both. Discrete amplifier system 506 receives the optical signals. Discrete amplifier system 506 amplifies the optical signals having wavelengths in the target wavelength band. The target wavelength band has a bandwidth of at least 80 nm. Discrete amplifier system 506 transfers the optical signals to fiber span 508. Pump system 510 forward pumps light onto fiber span 508. The light amplifies the optical signals having wavelengths in the longer wavelength band, the shorter wavelength band, or both. Based on the above description, one skilled in the art would be able to modify existing optical amplifier systems to make optical amplifier system 500.

Pump systems 504 and 510 can be turned on and off depending on different circumstances. For instance, if fiber span 502 has a length of less than 40 km, then a 10 to 15 dB gain may be needed. Only one of the pump systems 504 or 510 may need to be turned on to generate this gain. If more gain is needed, the noise figure is not good enough, or a problem is encountered, then the other pump system can be turned on.

FIG. 4b illustrates a gain and noise figure generated by optical amplifier system 500 also. As with optical amplifier system 400, optical amplifier system 500 generates a noise figure (NF) that is substantially flat over the gain bandwidth.

Example—FIGS. 6 and 7a–d

Figure 6:
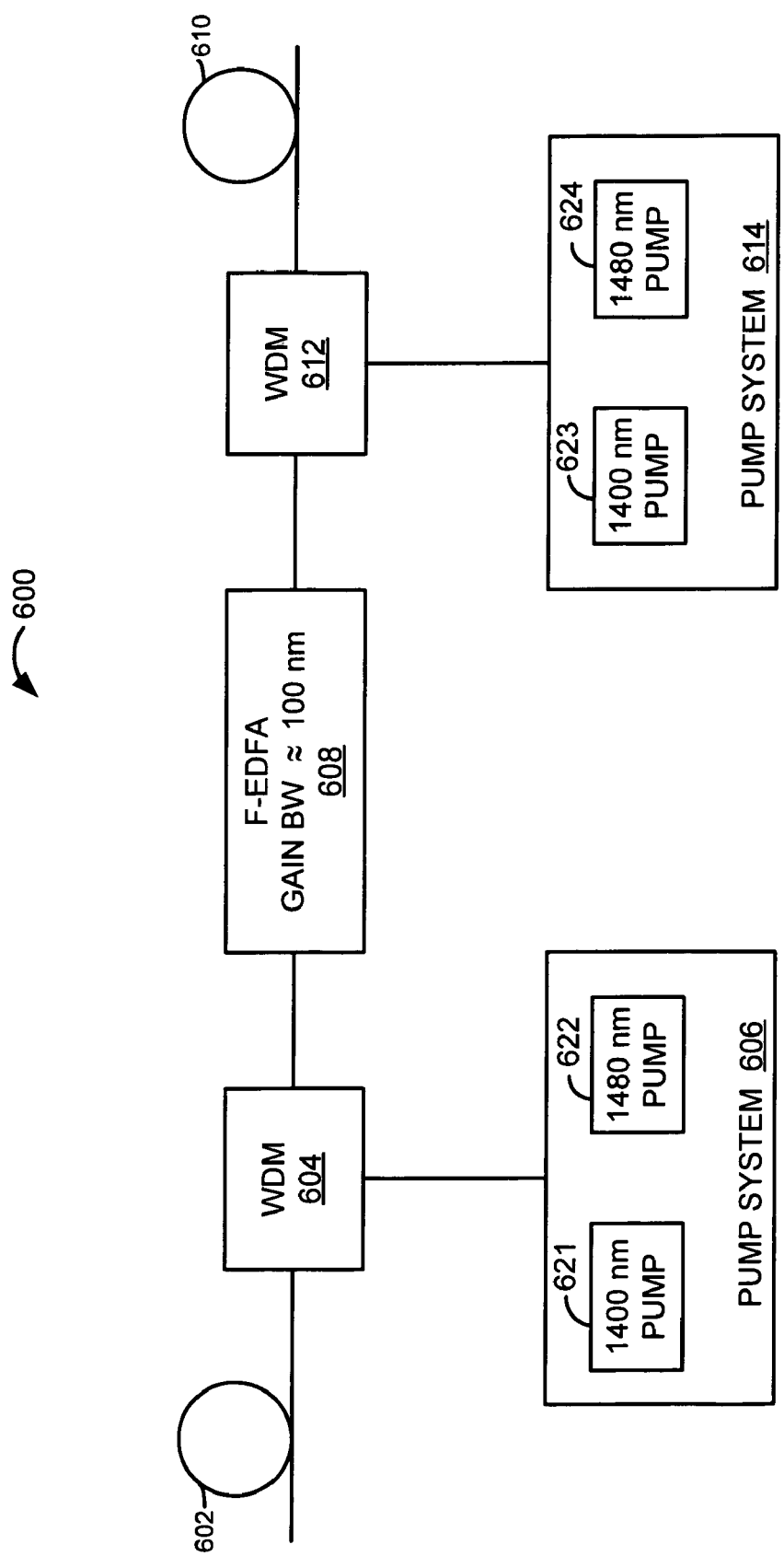
FIG. 6 illustrates an optical amplifier system in an example of the invention.

FIG. 6 illustrates another example of an optical amplifier system 600 in an example of the invention. Optical amplifier system 600 is comprised of a transmission fiber span 602, a Wavelength Division Multiplexer (WDM) 604, a pump system 606, a Fluoride-based Erbium-Doped Fiber Amplifier, (F-EDFA) 608, a transmission fiber span 610, a WDM 612, and a pump system 614. F-EDFA 608 and WDM 604 are coupled to fiber span 602. F-EDFA 608 and WDM 612 are coupled to fiber span 610. Pump system 606 is coupled to WDM 604. Pump system 614 is coupled to WDM 612.

Pump system 606 includes a 1400 nm pump 621 and a 1480 nm pump 622. Pump systems 614 includes a 1400 nm pump 623 and a 1480 nm pump 624. Pumps 621–624 may be conventional Raman pumps having a power of about 250 mW. The 1400 nm pumps 621 and 623 could be in the range of 1390 nm to 1410 nm, but 1400 nm is used as an approximation. Similarly, the 1480 nm pumps 622 and 624 could be in the range of 1470 nm to 1500 nm, but 1480 nm is used as an approximation. Pump systems 606 and 614 may include multiple 1400 nm pumps and multiple 1480 nm pumps as a design choice.

F-EDFA 608 has a gain bandwidth of about 100 nm. F-EDFA 608 is configured to amplify the optical signals having wavelengths between about 1500 nm and about 1600 nm (the C-band, the L-band, and the S-band).

In operation, fiber span 602 transports optical signals. Pump 621 backward pumps light having a 1400 nm wavelength onto fiber span 602 through WDM 604. Pump 622 backward pumps light having a 1480 nm wavelength onto fiber span 602 through WDM 604. The 1400 nm light amplifies the optical signals having wavelengths in the S-band. The 1480 nm light amplifies the optical signals having wavelengths in the L-band.

F-EDFA 608 receives the optical signals from fiber span 602. F-EDFA 608 amplifies the optical signals having wavelengths in the C-band, the L-band, and the S-band. The bandwidth of the combined C-band, L-band, and S-band is about 100 nm. F-EDFA 608 transfers the optical signals to fiber span 610.

Pump 623 forward pumps light having a 1400 nm wavelength onto fiber span 610 through WDM 612. Pump 624 forward pumps light having a 1480 nm wavelength onto fiber span 610 through WDM 612. The 1400 nm light amplifies the optical signals having wavelengths in the S-band. The 1480 nm light amplifies the optical signals having wavelengths in the L-band.

Figure 7A:
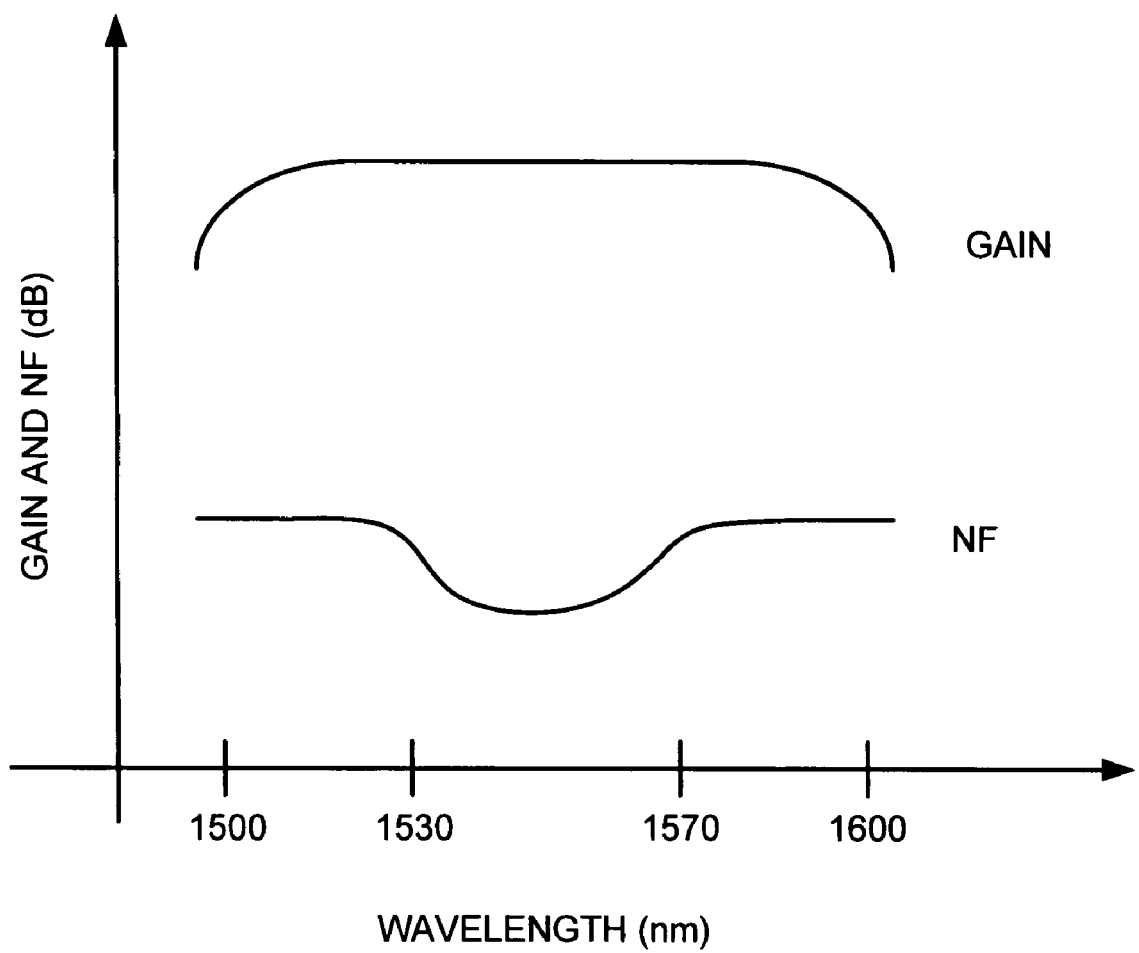
FIG. 7a illustrates a gain and noise figure generated by a Fluoride-based EDFA.

The configuration in FIG. 6 is a general configuration that can be changed as desired. If all of pumps 621–624 are shut off and F-EDFA 608 is operating alone, the gain and noise figure (NF) are illustrated in FIG. 7a. F-EDFA 608 generates a gain over the C-band, the L-band, and the S-band. The noise figure is relatively low for the C-band. However, the noise figure may be undesirable for the L-band and the S-band. The L-band and the S-band may not be able to be used to carry data over long distances because of the high noise figure.

Pump systems 606 and 614 are configured to amplify the L-band and/or the S-band to help lower the noise figure over these bands and to flatten the noise figure over the entire gain bandwidth.

Figure 7B:
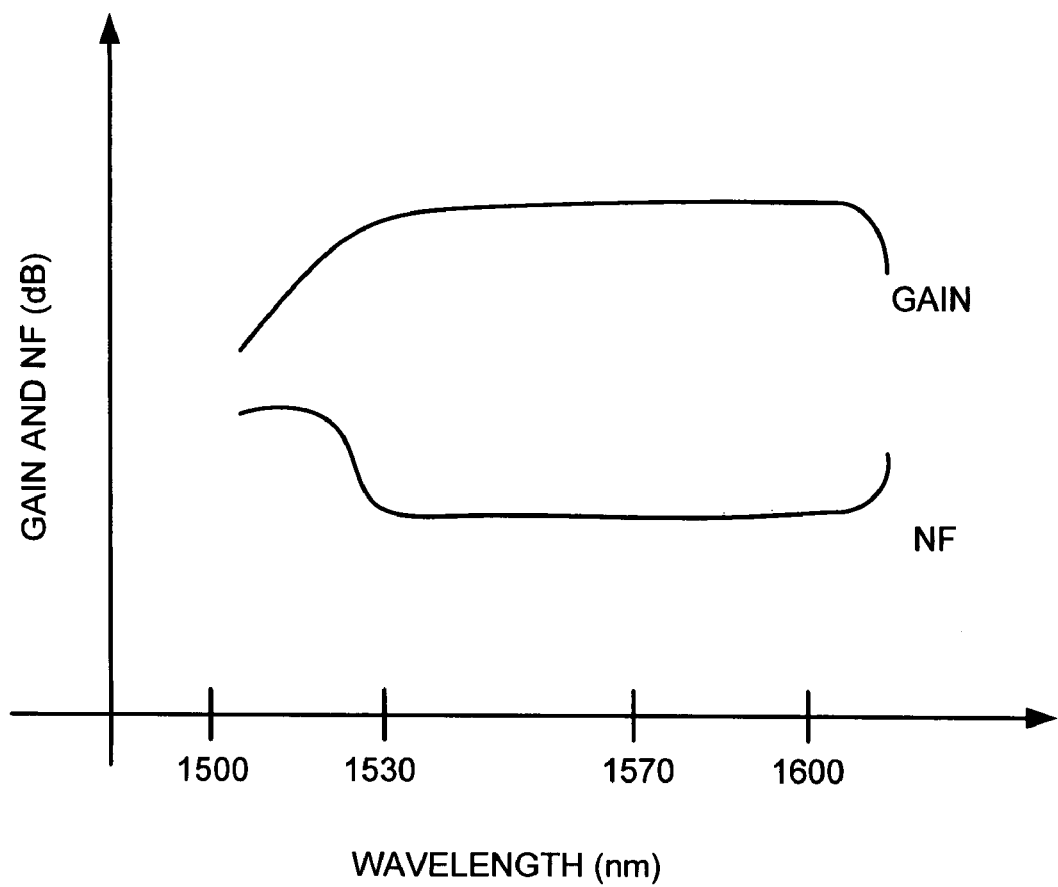
FIGS. 7b–d illustrate gain and noise figures generated by the optical amplifier system in FIG. 6 in an example of the invention.

If the L-band is needed to carry data in addition to the C-band, then pump 622 or 624 is turned on. With pump 622 or 624 turned on, the gain and noise figure (NF) generated by optical amplifier system 600 are illustrated in FIG. 7b. The noise figure is relatively low for the C-band and the L-band, and the L-band may be used to carry data.

Figure 7C:
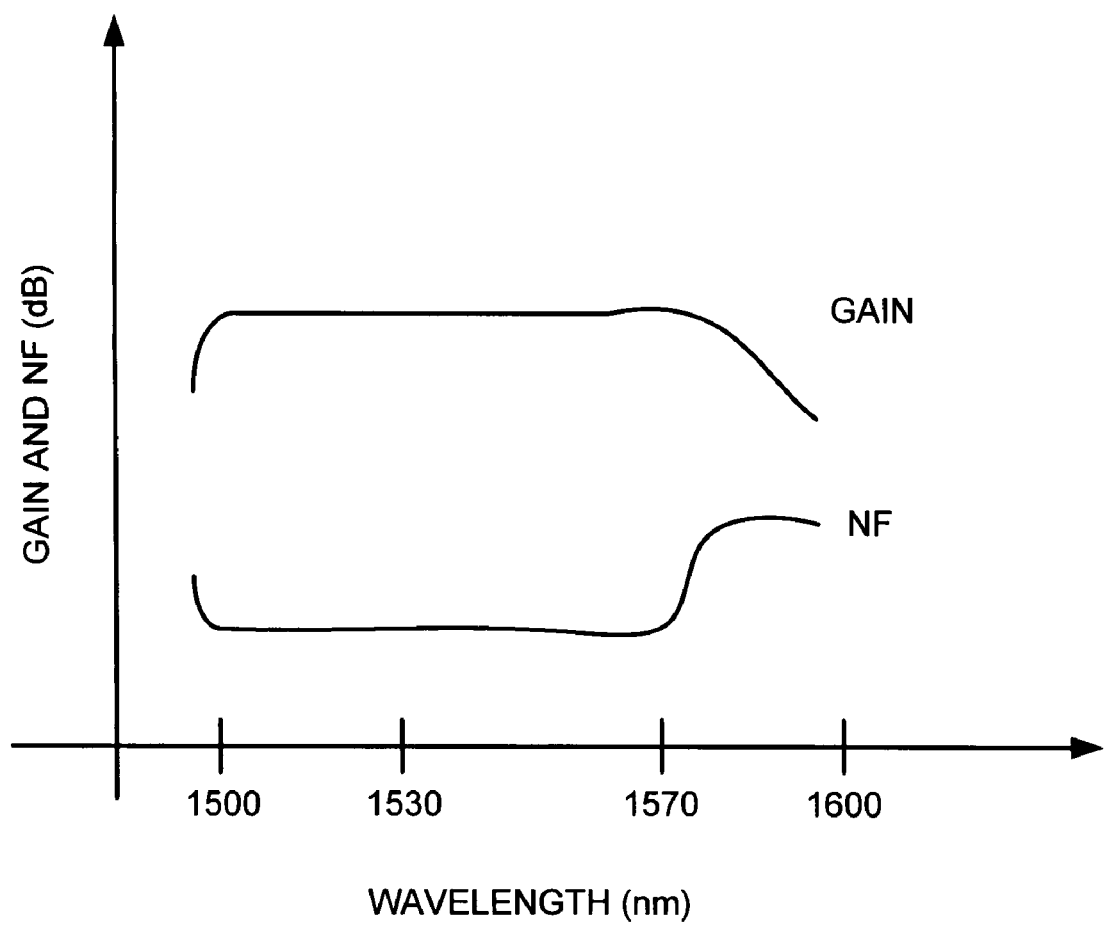

If the S-band is needed to carry data in addition to the C-band, then pump 621 or 623 is turned on. With pump 621 or 623 turned on, the gain and noise figure (NF) generated by optical amplifier system 600 are illustrated in FIG. 7c. The noise figure is relatively low for the C-band and the S-band, and the S-band may be used to carry data.

Figure 7D:
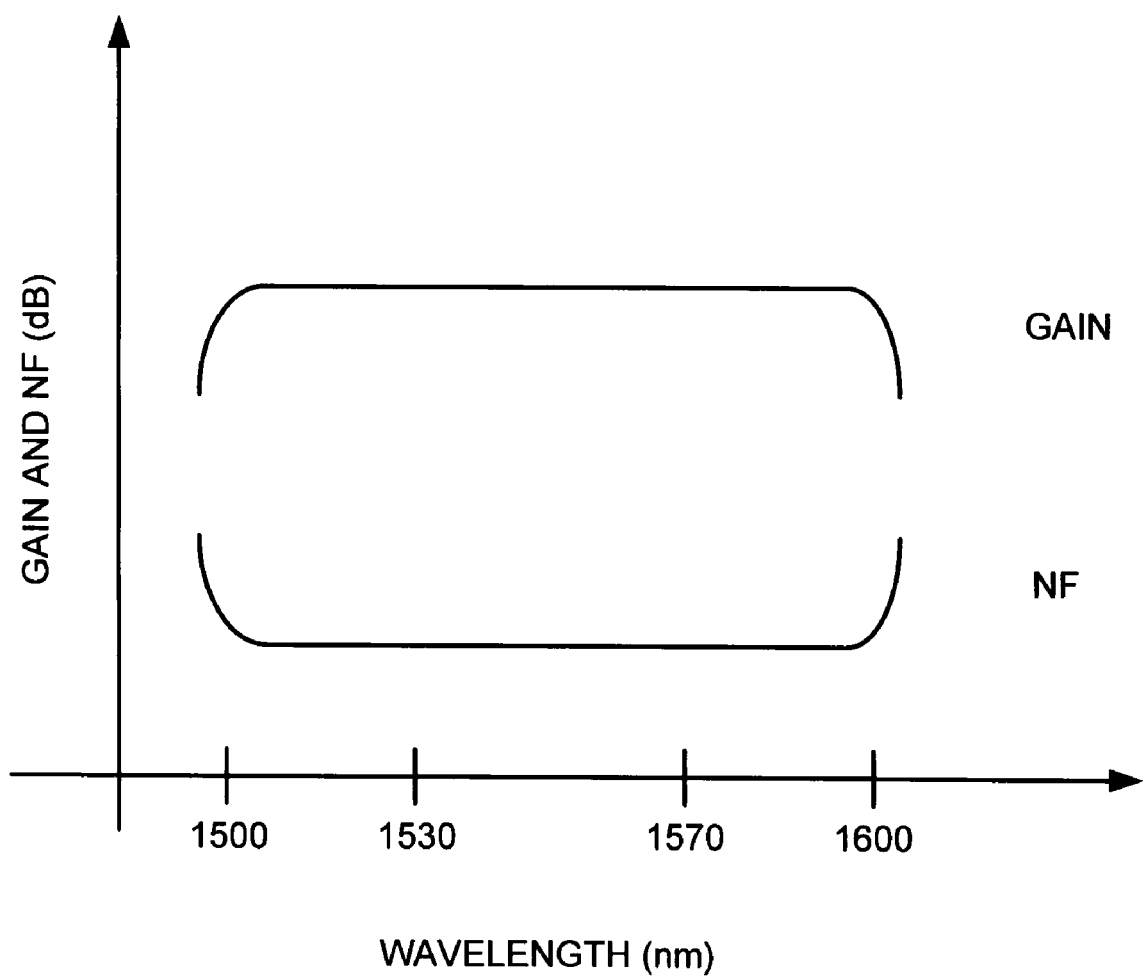

If the L-band and the S-band are needed to carry data in addition to the C-band, then pump 621 or 623 is turned on and pump 622 or 624 is turned on. With pumps 621 and 622 turned on, the gain and noise figure (NF) generated by optical amplifier system 600 are illustrated in FIG. 7d. The noise figure is relatively low for the C-band, the L-band, and the S-band, and the L-band, the C-band, and the S-band may all be used to carry data.

Pumps 622 and 624 may be turned on and off depending on the conditions. If fiber span 602 is 40 km in length or less, then only one of pumps 622 or 624 may be needed to provide the required gain. If fiber span 602 is greater than 40 km in length and one pump 622 does not provide the required gain, then the other pump 624 may be turned on to provide more gain. If pump 622 stops working, then pump 624 may be turned on to provide the gain instead of pump 622.

If a lot of signals are loaded in the S-band region, energy transfer from the S-band signals to the L-band signals occurs. When this happens, pumps 622 and/or 624 may be turned off.

In a similar manner, pumps 621 and 623 may be turned on and off depending on the conditions.

Figure 8:
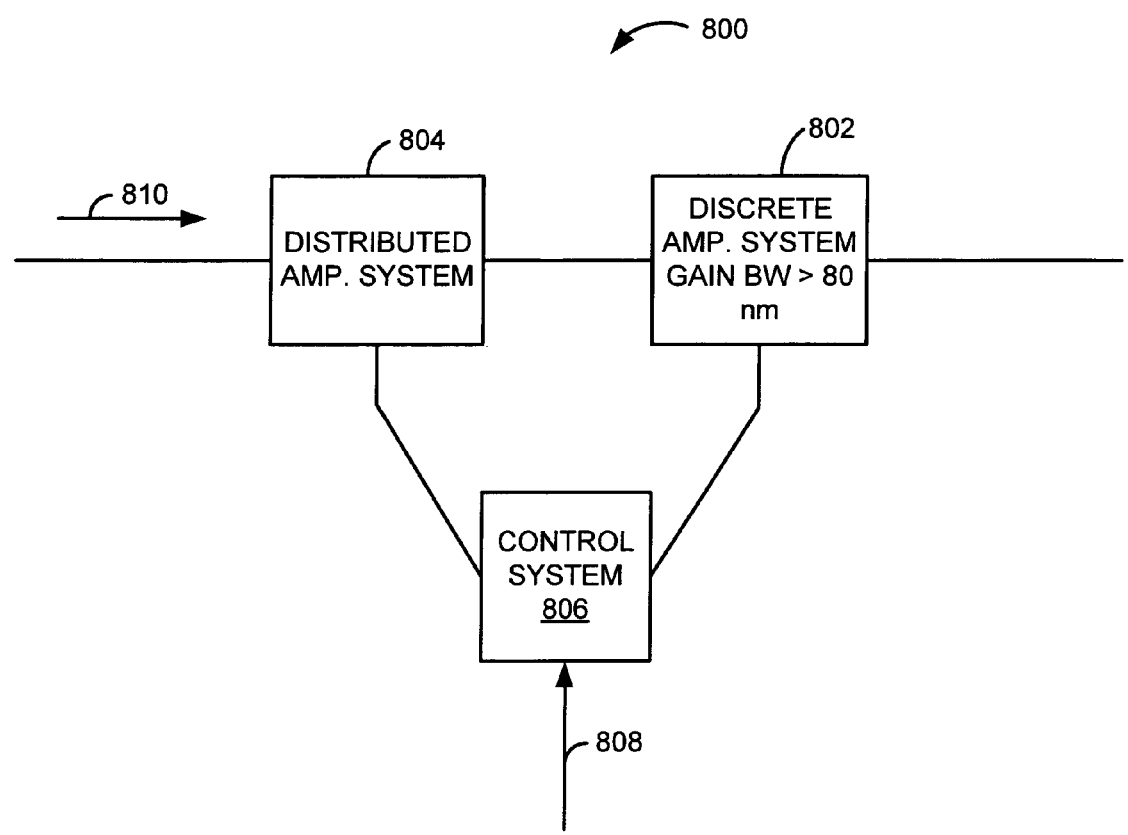
FIG. 8 illustrates an optical amplifier system with a control system in an example of the invention.

Optical Amplifier System with a Control System—FIG. 8

FIG. 8 illustrates an optical amplifier system 800 with a control system 806 in an example of the invention. Optical amplifier system 800 is comprised of a discrete amplifier system 802, a distributed amplifier system 804, and a control system 806. Discrete amplifier system 802 has a gain bandwidth greater than 80 nm.

In operation, control system 806 receives instructions 808 on how to amplify optical signals 810. The instructions 808 could come from a user, a computer, a server, or any other type of system. Control system 806 processes the instructions 808 to control the amplification of the optical signals 810. Control system 806 may control distributed amplifier system 804, discrete amplifier system 802, or both to control the amplification of the optical signals 810. Discrete amplifier system 802 may be a static amplifier that is not adjusted by control system 806.

Distributed amplifier system 804 receives optical signals 810. Distributed amplifier system 804 amplifies the optical signals 810 having wavelengths in a longer wavelength band of the target wavelength band, a shorter wavelength band of the target wavelength band, or both based on the control of control system 806.

Discrete amplifier system 802 receives the optical signals 810. Discrete amplifier system 802 amplifies the optical signals having wavelengths in the target wavelength band. The target wavelength band has a bandwidth of at least 80 nm. Control system 806 may adjust discrete amplifier system 802 to control the bandwidth of the target wavelength band. For instance, control system 806 may adjust discrete amplifier system 802 to generate a target wavelength band having a bandwidth of about 100 nm.

If a user experiences noise problems with the outer wavelengths of the target wavelength band, then the user can program control system 806 to control amplification of the outer wavelengths. Responsive to the user's commands, control system 806 controls distributed amplifier system 804 to amplify the longer wavelength band, the shorter wavelength band, or both to help alleviate the noise problems.

Distributed amplifier system 804 may be comprised of one or more pumps. To control the amplification of the optical signals, control system 806 may turn the pumps on and off to generate the desired gain.

What is claimed is:

1. An optical amplifier system, comprising:
   a discrete amplifier system configured to receive optical signals, amplify the optical signals having wavelengths in a target wavelength band comprising the C-band, the L-band, and the S-band, wherein the target wavelength band has a bandwidth of at least 80 nm, and transfer the optical signals; and
   a distributed amplifier system configured to amplify the optical signals having wavelengths in at least one of a longer wavelength band and a shorter wavelength band of the target wavelength band.

2. The optical amplifier system of claim 1 wherein a noise figure for the amplification of the optical signals is substantially flat over the target wavelength band.

3. The optical amplifier system of claim 1 wherein the distributed amplifier system is configured to amplify the optical signals having wavelengths in the L-band.

4. The optical amplifier system of claim 1 wherein the distributed amplifier system is configured to amplify the optical signals having wavelengths in the S-band.

5. The optical amplifier system of claim 1 wherein the distributed amplifier system is configured to amplify the optical signals having wavelengths in the L-band and the S-band.

6. The optical amplifier system of claim 1 wherein the discrete optical amplifier comprises a Fluoride-based Erbium-Doped Fiber Amplifier (F-EDPA).

7. The optical amplifier system of claim 1 wherein the distributed amplifier system comprises:
   a transmission fiber span configured to transport the optical signals; and
   a pump system configured to pump light onto the transmission fiber span to amplify the optical signals having wavelengths in at least one of the longer wavelength band and the shorter wavelength band of the target wavelength band.

8. The optical amplifier system of claim 7 wherein the pump system is configured to backward pump the light onto the transmission fiber span.

9. The optical amplifier system of claim 7 wherein the pump system is configured to forward pump the light onto the transmission fiber span.

10. A method of operating an optical amplifier system, wherein the optical amplifier system comprises a discrete amplifier system and a distributed amplifier system, the method comprising the steps of:
    amplifying the optical signals having wavelengths in a target wavelength band comprising the C-band, the L-band, and the S-band with the discrete amplifier system, wherein the target wavelength band has a bandwidth of at least 80 nm; and
    amplifying the optical signals having wavelengths in at least one of a longer wavelength band and a shorter wavelength band of the target wavelength band with the distributed amplifier system.

11. The method of claim 10 wherein the noise figure for the amplification of the optical signals is substantially flat over the target wavelength band.

12. The method of claim 10 wherein the step of amplifying the optical signals having wavelengths in at least one of a longer wavelength band and a shorter wavelength band with the distributed amplifier system comprises:
    amplifying the optical signals having wavelengths in the L-band.

13. The method of claim 10 wherein the step of amplifying the optical signals having wavelengths in at least one of a longer wavelength band and a shorter wavelength band with the distributed amplifier system comprises:

amplifying the optical signals having wavelengths in the S-band.

14. The method of claim 10 wherein the step of amplifying the optical signals having wavelengths in at least one of a longer wavelength band and a shorter wavelength band with the distributed amplifier system comprises:

amplifying the optical signals having wavelengths in the L-band and the S-band.

15. The method of claim 10 wherein the discrete amplifier system comprises a Fluoride-based Erbium-Doped Fiber Amplifier (F-EDFA).

16. The method of claim 10 wherein the distributed amplifier system comprises a transmission fiber span and a pump system and further comprising the step of:

backward pumping light onto the transmission fiber span with the pump system.

17. The method of claim 10 wherein the distributed amplifier system comprises a transmission fiber span and a pump system and further comprising the step of:

forward pumping light onto the transmission fiber span with the pump system.

* * * * *